United States Patent
Davis et al.

(10) Patent No.: US 9,147,252 B2
(45) Date of Patent: *Sep. 29, 2015

(54) METHOD FOR PARTITIONING A PATTERN INTO OPTIMIZED SUB-PATTERNS

(75) Inventors: Jason Davis, Bellingham, MA (US); Juha Koljonen, Needham, MA (US)

(73) Assignee: Cognex Technology and Investment LLC, Mountain View, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 13/330,003

(22) Filed: Dec. 19, 2011

(65) Prior Publication Data

US 2012/0155768 A1    Jun. 21, 2012

Related U.S. Application Data

(63) Continuation of application No. 10/625,201, filed on Jul. 22, 2003, now Pat. No. 8,081,820.

(51) Int. Cl.
| | | |
|---|---|---|
| *G06K 9/34* | (2006.01) | |
| *G06K 9/46* | (2006.01) | |
| *G06K 9/66* | (2006.01) | |
| *G06T 7/00* | (2006.01) | |

(52) U.S. Cl.
CPC ............ *G06T 7/0042* (2013.01); *G06K 9/469* (2013.01); *G06T 7/0083* (2013.01); *G06T 7/0093* (2013.01)

(58) Field of Classification Search
USPC .................. 382/173, 181, 190, 209, 224, 225
See application file for complete search history.

(56) References Cited

U.S. PATENT DOCUMENTS

| | | | |
|---|---|---|---|
| 3,069,654 A | 12/1962 | Hough | |
| 3,560,930 A | 2/1971 | Howard | |
| 3,816,722 A | 6/1974 | Sakoe et al. | |
| 3,898,617 A | 8/1975 | Kashioka et al. | |
| 3,899,240 A | 8/1975 | Gabor | |
| 3,899,771 A | 8/1975 | Saraga et al. | |

(Continued)

FOREIGN PATENT DOCUMENTS

| | | |
|---|---|---|
| DE | 44 06 020 | 6/1995 |
| EP | 0265302 | 9/1987 |

(Continued)

OTHER PUBLICATIONS

"Apex Model Object", *Cognex Corporation*, acuWin version 1.5, (1997), pp. 1-17.

(Continued)

*Primary Examiner* — John Strege

(57) ABSTRACT

A method is provided for dividing a pattern into a plurality of sub-patterns, each sub-pattern being adapted for use with an image search method that can provide a plurality of sub-pattern search results. The method represents the pattern as a plurality of feature points, generates candidate partitions of the plurality of feature points, and then scores the candidate partitions by examining characteristics of each potential sub-pattern of each candidate partition. The highest-scoring partition is selected, and then it is applied to the plurality of feature points, creating one or more sub-pluralities of features. The invention advantageously provides a plurality of sub-patterns where each sub-pattern contains enough information to be located with a feature-based search method, where that information has been pre-evaluated as being useful and particularly adapted for running feature-based searches.

20 Claims, 6 Drawing Sheets

(56) References Cited

U.S. PATENT DOCUMENTS

| | | | |
|---|---|---|---|
| 3,936,800 | A | 2/1976 | Ejiri et al. |
| 3,986,007 | A | 10/1976 | Ruoff |
| 4,115,702 | A | 9/1978 | Nopper |
| 4,115,762 | A | 9/1978 | Akiyama et al. |
| 4,183,013 | A | 1/1980 | Agrawala et al. |
| 4,200,861 | A | 4/1980 | Hubach et al. |
| 4,213,150 | A | 7/1980 | Robinson et al. |
| 4,295,198 | A | 10/1981 | Copeland et al. |
| 4,441,205 | A | 4/1984 | Berkin et al. |
| 4,441,206 | A | 4/1984 | Kuniyoshi et al. |
| 4,441,248 | A | 4/1984 | Sherman et al. |
| 4,567,610 | A | 1/1986 | McConnell |
| 4,570,180 | A | 2/1986 | Baier et al. |
| 4,581,762 | A | 4/1986 | Lapidus et al. |
| 4,637,055 | A | 1/1987 | Taylor |
| 4,651,341 | A | 3/1987 | Nakashima et al. |
| 4,672,676 | A | 6/1987 | Linger |
| 4,685,143 | A | 8/1987 | Choate |
| 4,688,088 | A | 8/1987 | Hamazaki et al. |
| 4,707,647 | A | 11/1987 | Coldren et al. |
| 4,736,437 | A | 4/1988 | Sacks et al. |
| 4,746,251 | A | 5/1988 | Yoshikawa et al. |
| 4,763,280 | A | 8/1988 | Robinson et al. |
| 4,783,826 | A | 11/1988 | Koso |
| 4,783,828 | A | 11/1988 | Sadjadi |
| 4,783,829 | A | 11/1988 | Miyakawa et al. |
| 4,799,175 | A | 1/1989 | Sano et al. |
| 4,809,348 | A | 2/1989 | Meyer et al. |
| 4,823,394 | A | 4/1989 | Berkin et al. |
| 4,843,631 | A | 6/1989 | Steinpichler et al. |
| 4,845,765 | A | 7/1989 | Juvin et al. |
| 4,849,914 | A | 7/1989 | Medioni et al. |
| 4,860,374 | A | 8/1989 | Murakami et al. |
| 4,860,375 | A | 8/1989 | McCubbrey et al. |
| 4,876,457 | A | 10/1989 | Bose |
| 4,876,728 | A | 10/1989 | Roth |
| 4,893,346 | A | 1/1990 | Bishop |
| 4,903,313 | A | 2/1990 | Tachikawa |
| 4,922,543 | A | 5/1990 | Ahlbom et al. |
| 4,955,062 | A | 9/1990 | Terui |
| 4,959,898 | A | 10/1990 | Landman et al. |
| 4,962,541 | A | 10/1990 | Doi et al. |
| 4,972,359 | A | 11/1990 | Silver et al. |
| 4,979,223 | A | 12/1990 | Manns et al. |
| 4,980,971 | A | 1/1991 | Bartschat et al. |
| 4,982,438 | A | 1/1991 | Usami et al. |
| 5,003,166 | A | 3/1991 | Girod |
| 5,020,006 | A | 5/1991 | Sporon-Fiedler |
| 5,027,417 | A | 6/1991 | Kitakado et al. |
| 5,033,099 | A | 7/1991 | Yamada et al. |
| 5,040,231 | A | 8/1991 | Terzian |
| 5,046,109 | A | 9/1991 | Fujimori et al. |
| 5,048,094 | A | 9/1991 | Aoyama et al. |
| 5,060,276 | A | 10/1991 | Morris et al. |
| 5,072,384 | A | 12/1991 | Doi et al. |
| 5,086,478 | A | 2/1992 | Kelly-Mahaffey et al. |
| 5,111,516 | A | 5/1992 | Nakano et al. |
| 5,113,565 | A | 5/1992 | Cipolla et al. |
| 5,161,201 | A | 11/1992 | Kaga et al. |
| 5,168,530 | A | 12/1992 | Peregrim et al. |
| 5,177,559 | A | 1/1993 | Batchelder et al. |
| 5,206,917 | A | 4/1993 | Ueno et al. |
| 5,245,674 | A | 9/1993 | Cass et al. |
| 5,253,306 | A | 10/1993 | Nishio |
| 5,253,308 | A | 10/1993 | Johnson |
| 5,268,999 | A | 12/1993 | Yokoyama |
| 5,272,657 | A | 12/1993 | Basehore |
| 5,280,351 | A | 1/1994 | Wilkinson |
| 5,313,532 | A | 5/1994 | Harvey et al. |
| 5,343,028 | A | 8/1994 | Figarella et al. |
| 5,347,595 | A | 9/1994 | Bokser |
| 5,371,690 | A | 12/1994 | Engel et al. |
| 5,384,711 | A | 1/1995 | Kanai et al. |
| 5,398,292 | A | 3/1995 | Aoyama |
| 5,459,636 | A | 10/1995 | Gee et al. |
| 5,471,403 | A | 11/1995 | Fujimaga |
| 5,471,541 | A | 11/1995 | Burtnyk et al. |
| 5,481,712 | A | 1/1996 | Silver et al. |
| 5,487,117 | A * | 1/1996 | Burges et al. ................. 382/173 |
| 5,495,537 | A | 2/1996 | Bedrosian et al. |
| 5,497,451 | A | 3/1996 | Holmes |
| 5,500,906 | A | 3/1996 | Picard et al. |
| 5,513,275 | A | 4/1996 | Khalaj et al. |
| 5,537,669 | A | 7/1996 | Evans et al. |
| 5,544,254 | A | 8/1996 | Hartley et al. |
| 5,545,887 | A | 8/1996 | Smith et al. |
| 5,550,763 | A | 8/1996 | Michael |
| 5,550,937 | A | 8/1996 | Bell et al. |
| 5,555,317 | A | 9/1996 | Anderson |
| 5,555,320 | A | 9/1996 | Irie et al. |
| 5,568,563 | A | 10/1996 | Tanaka et al. |
| 5,586,058 | A | 12/1996 | Aloni et al. |
| 5,602,938 | A | 2/1997 | Akiyama et al. |
| 5,613,013 | A | 3/1997 | Schuette |
| 5,621,807 | A | 4/1997 | Eibert et al. |
| 5,623,560 | A | 4/1997 | Nakajima et al. |
| 5,625,707 | A | 4/1997 | Diep et al. |
| 5,625,715 | A | 4/1997 | Trew et al. |
| 5,627,912 | A | 5/1997 | Matsumoto |
| 5,627,915 | A | 5/1997 | Rosser |
| 5,633,951 | A | 5/1997 | Moshfeghi |
| 5,638,116 | A | 6/1997 | Shimoura et al. |
| 5,638,489 | A | 6/1997 | Tsuboka |
| 5,650,828 | A | 7/1997 | Lee |
| 5,663,809 | A | 9/1997 | Miyaza et al. |
| 5,673,334 | A | 9/1997 | Nichani et al. |
| 5,686,973 | A | 11/1997 | Lee |
| 5,694,487 | A | 12/1997 | Lee |
| 5,703,960 | A | 12/1997 | Soest |
| 5,703,964 | A | 12/1997 | Menon et al. |
| 5,708,731 | A | 1/1998 | shmotori et al. |
| 5,717,785 | A | 2/1998 | Silver |
| 5,754,226 | A | 5/1998 | Yamada et al. |
| 5,768,421 | A | 6/1998 | Gaffin et al. |
| 5,793,901 | A | 8/1998 | Matsutake et al. |
| 5,796,868 | A | 8/1998 | Dutta-Choudhury |
| 5,815,198 | A | 9/1998 | Vachtsevanos et al. |
| 5,822,742 | A | 10/1998 | Alkon et al. |
| 5,825,913 | A | 10/1998 | Rostami et al. |
| 5,825,922 | A | 10/1998 | Pearson et al. |
| 5,828,769 | A | 10/1998 | Burns |
| 5,828,770 | A | 10/1998 | Leis et al. |
| 5,835,622 | A | 11/1998 | Koljonen et al. |
| 5,845,288 | A | 12/1998 | Syeda-Mahmood |
| 5,848,184 | A | 12/1998 | Taylor et al. |
| 5,848,189 | A | 12/1998 | Pearson et al. |
| 5,850,466 | A | 12/1998 | Schott et al. |
| 5,850,469 | A | 12/1998 | Martin et al. |
| 5,859,923 | A | 1/1999 | Petry et al. |
| 5,862,245 | A | 1/1999 | Renouard et al. |
| 5,864,779 | A | 1/1999 | Fujimoto |
| 5,871,018 | A | 2/1999 | Delp et al. |
| 5,875,040 | A | 2/1999 | Matraszek et al. |
| 5,881,170 | A | 3/1999 | Araki et al. |
| 5,890,808 | A | 4/1999 | Neff et al. |
| 5,912,984 | A | 6/1999 | michael et al. |
| 5,912,985 | A | 6/1999 | Morimoto et al. |
| 5,917,733 | A | 6/1999 | Bangham |
| 5,926,568 | A | 7/1999 | Chaney et al. |
| 5,930,391 | A | 7/1999 | Kinjo |
| 5,933,516 | A | 8/1999 | Tu et al. |
| 5,933,523 | A | 8/1999 | Drisko et al. |
| 5,937,084 | A | 8/1999 | Crabtree et al. |
| 5,940,535 | A | 8/1999 | Huang |
| 5,943,442 | A | 8/1999 | Tanaka |
| 5,950,158 | A | 9/1999 | Wang |
| 5,974,169 | A | 10/1999 | Bachelder |
| 5,974,365 | A | 10/1999 | Mitchell |
| 5,982,475 | A | 11/1999 | Bruning et al. |
| 5,995,648 | A | 11/1999 | Drisko et al. |
| 5,995,953 | A | 11/1999 | Rindtorff et al. |
| 6,002,793 | A | 12/1999 | Silver et al. |
| 6,005,978 | A | 12/1999 | Garakani |
| 6,021,220 | A | 2/2000 | Anderholm |

(56) References Cited

U.S. PATENT DOCUMENTS

| | | |
|---|---|---|
| 6,023,530 A | 2/2000 | Wilson |
| 6,026,186 A | 2/2000 | Fan |
| 6,026,359 A | 2/2000 | Yamaguchi et al. |
| 6,035,066 A | 3/2000 | Michael |
| 6,052,489 A | 4/2000 | Sakaue |
| 6,061,086 A | 5/2000 | Reimer et al. |
| 6,064,958 A | 5/2000 | Takahashi et al. |
| 6,067,379 A | 5/2000 | Silver |
| 6,070,160 A | 5/2000 | Geary |
| 6,078,700 A | 6/2000 | Sarachik |
| 6,081,620 A | 6/2000 | Anderholm |
| 6,111,984 A | 8/2000 | Fukasawa |
| 6,115,052 A | 9/2000 | Freeman et al. |
| 6,122,399 A | 9/2000 | Moed |
| 6,128,405 A | 10/2000 | Fujii |
| 6,137,893 A | 10/2000 | Michael et al. |
| 6,151,406 A | 11/2000 | Chang et al. |
| 6,154,566 A | 11/2000 | Mine et al. |
| 6,173,066 B1 | 1/2001 | Peurach et al. |
| 6,173,070 B1 | 1/2001 | Michael et al. |
| 6,178,261 B1 | 1/2001 | Williams et al. |
| 6,188,784 B1 | 2/2001 | Linker et al. |
| 6,215,915 B1 | 4/2001 | Reyzin |
| 6,226,418 B1 | 5/2001 | Miller et al. |
| 6,246,478 B1 | 6/2001 | Chapman et al. |
| 6,272,244 B1 | 8/2001 | Takahashi et al. |
| 6,272,245 B1 | 8/2001 | lin |
| 6,311,173 B1 | 10/2001 | Levin |
| 6,324,298 B1 | 11/2001 | O'Dell et al. |
| 6,324,299 B1 | 11/2001 | Sarachik et al. |
| 6,345,106 B1 | 2/2002 | Borer |
| 6,363,173 B1 | 3/2002 | Stentz et al. |
| 6,381,375 B1 | 4/2002 | Reyzin |
| 6,385,340 B1 | 5/2002 | Wilson |
| 6,396,949 B1 | 5/2002 | Nichani |
| 6,408,109 B1 | 6/2002 | Silver et al. |
| 6,421,458 B2 | 7/2002 | Michael et al. |
| 6,453,069 B1 | 9/2002 | Matsugu et al. |
| 6,457,032 B1 | 9/2002 | Silver |
| 6,462,751 B1 | 10/2002 | Felser et al. |
| 6,466,923 B1 | 10/2002 | Young et al. |
| 6,516,092 B1 | 2/2003 | Bachelder et al. |
| 6,529,852 B2 | 3/2003 | Knoll et al. |
| 6,532,301 B1 | 3/2003 | Krumm et al. |
| 6,625,303 B1 | 9/2003 | Young et al. |
| 6,636,634 B2 | 10/2003 | Melikian et al. |
| 6,639,624 B1 | 10/2003 | Bachelder et al. |
| 6,658,145 B1 | 12/2003 | Silver et al. |
| 6,690,842 B1 | 2/2004 | Silver et al. |
| 6,691,126 B1 | 2/2004 | Syeda-Mahmood |
| 6,691,145 B1 | 2/2004 | Shibata et al. |
| 6,748,104 B1 | 6/2004 | Bachelder et al. |
| 6,760,483 B1 | 7/2004 | Elichai et al. |
| 6,771,808 B1 | 8/2004 | Wallack |
| 6,785,419 B1 | 8/2004 | Jojic et al. |
| 6,850,646 B1 | 2/2005 | Silver |
| 6,856,698 B1 | 2/2005 | Silver et al. |
| 6,859,548 B2 | 2/2005 | Yoshioka et al. |
| 6,903,177 B2 | 6/2005 | Seo et al. |
| 6,909,798 B1 | 6/2005 | Yukawa et al. |
| 6,950,548 B1 | 9/2005 | Bachelder et al. |
| 6,963,338 B1 | 11/2005 | Bachelder et al. |
| 6,973,207 B1 | 12/2005 | Akopyan et al. |
| 6,975,764 B1 | 12/2005 | Silver et al. |
| 6,985,625 B1 | 1/2006 | Silver et al. |
| 6,993,192 B1 | 1/2006 | Silver et al. |
| 7,006,712 B1 | 2/2006 | Silver et al. |
| 7,016,539 B1 | 3/2006 | Silver et al. |
| 7,043,081 B1 | 5/2006 | Silver et al. |
| 7,058,225 B1 | 6/2006 | Silver et al. |
| 7,065,262 B1 | 6/2006 | Silver et al. |
| 7,088,862 B1 | 8/2006 | Silver et al. |
| 7,139,421 B1 | 11/2006 | Fix et al. |
| 7,164,796 B1 | 1/2007 | Silver et al. |
| 7,190,834 B2 | 3/2007 | Davis |
| 7,239,929 B2 | 7/2007 | Ulrich et al. |
| 7,251,366 B1 | 7/2007 | Silver et al. |
| 7,853,919 B2 | 12/2010 | Huang et al. |
| 8,081,820 B2 * | 12/2011 | Davis et al. ............ 382/173 |
| 8,229,222 B1 | 7/2012 | Silver et al. |
| 8,244,041 B1 | 8/2012 | Silver et al. |
| 8,249,362 B1 | 8/2012 | Silver et al. |
| 8,254,695 B1 | 8/2012 | Silver et al. |
| 8,265,395 B1 | 9/2012 | Silver et al. |
| 8,270,748 B1 | 9/2012 | Silver et al. |
| 8,295,613 B1 | 10/2012 | Silver et al. |
| 8,320,675 B1 | 11/2012 | Silver et al. |
| 8,331,673 B1 | 12/2012 | Silver et al. |
| 8,335,380 B1 | 12/2012 | Silver et al. |
| 8,363,942 B1 | 1/2013 | Silver et al. |
| 8,363,956 B1 | 1/2013 | Silver et al. |
| 8,363,972 B1 | 1/2013 | Silver et al. |
| 2002/0054699 A1 | 5/2002 | Roesch et al. |
| 2004/0081346 A1 | 4/2004 | Louden et al. |
| 2005/0117801 A1 | 6/2005 | Davis et al. |
| 2006/0110063 A1 | 5/2006 | Weiss |
| 2009/0089736 A1 | 4/2009 | Huang et al. |
| 2009/0096790 A1 | 4/2009 | Wiedemann et al. |
| 2009/0185715 A1 | 7/2009 | Hofhauser et al. |
| 2010/0146476 A1 | 6/2010 | Huang et al. |
| 2013/0214280 A1 | 8/2013 | Sato, Mizuki |

FOREIGN PATENT DOCUMENTS

| | | |
|---|---|---|
| EP | 2598019 | 10/1987 |
| EP | 0341122 | 4/1989 |
| EP | 0527632 | 2/1993 |
| EP | 0777381 | 2/1999 |
| EP | 0895696 | 2/1999 |
| JP | 6378009 | 4/1988 |
| JP | 06-160047 | 6/1994 |
| JP | 3598651 | 12/2004 |
| WO | WO9110968 | 7/1991 |
| WO | WO9511491 | 4/1995 |
| WO | WO9521376 | 8/1995 |
| WO | WO9522137 | 8/1995 |
| WO | WO-9718524 | 5/1997 |
| WO | WO9721189 | 6/1997 |
| WO | WO9722858 | 6/1997 |
| WO | WO9724692 | 7/1997 |
| WO | WO9724693 | 7/1997 |
| WO | WO9739416 | 10/1997 |
| WO | WO9830890 | 7/1998 |
| WO | WO9852349 | 11/1998 |
| WO | WO9859490 | 12/1998 |
| WO | WO9915864 | 4/1999 |
| WO | WO9927456 | 6/1999 |
| WO | WO9948000 | 9/1999 |

OTHER PUBLICATIONS

"Apex Search Object Library Functions", *Cognex Corporation*, (1998).

"Apex Search Object", *acuWin version 1.5*, (1997), pp. 1-35.

"Cognex 2000/3000/4000 Vision Tools", *Cognex Corporation*, Chapter 2 Searching Revision 5.2 P/N 590-0103, (1992), pp. 1-68.

"Cognex 3000/4000/5000 Programmable Vision Engines, Vision Tools", *Chapter 1 Searching*, Revision 7.4 590-1036, (1996), pp. 1-68.

"Cognex 3000/4000/5000 Programmable Vision Engines, Vision Tools", *Chapter 14 Golden Template Comparision*, (1996), pp. 569-595.

"Description of Sobel Search", *Cognex Corporation*, (1998).

Alexander, et al., "The Registration of MR Images Using Multiscale Robust Methods", *Magnetic Resonance Imaging*, 1996, pp. 453-468 vol. 5.

Anisimov, V. et al., "Fast Hierarchical matching of an arbitrarily oriented template", *Pattern Recognition Letters*, vol. 14, No. 2, pp. 95-101 (1993).

Anuta, Paul E., "Spatial Registration of Multispectral and Multitemporal Digital Imagery Using Fast Fourier Transform Techniques", *IEEE Transactions On Geoscience Electronics*, Oct. 1970, pp. 353-368, vol. GE-8, No. 4.

(56) References Cited

OTHER PUBLICATIONS

Araujo, et al., "A Fully Projective Formulation for Lowe's Tracking Algorithm", *The University of Rochester Computer Science Department*, pp. 1-41, (Nov. 1996).
Ashburner, J et al., "Incorporating Prio Knowledge into Image Registration," Neuroimage, vol. 6, No. 4, pp. 344-352 (1997).
Ashburner, J et al., "Nonlinear Spatial Normalization using Basis Functions: The Welcome Depart. Of Cognitice Neurology", *Institute of Neurology, Queen Square, London, UK*, pp. 1-34 (1999).
Ashburner, J. et al., "Nonlinear Spatial Normalization using Basis Functions,", *Human Brain Mapping*, vol. 7, No. 4, pp. 254-266 (1999).
Bachelder, I et al., "Contour Matching Using Local Affine Transformations", *Massachusetts Institute of Technology Artificial Intelligence Laboratory*, A.I. Memo No. 1326 (Apr. 1992).
Baker, J "Multiresolution Statistical Object Recognition", *Artificial Intelligence Laboratory*, Massachusetts Institute of Technology, pp. 1-6, (1994).
Baker, J. "Multiresolution Statistical Object Recognition", *master's thesis, Massachusetts Institute of Technology*(1994).
Balkenius C. et al., "Elastic Template Matching as a Basis for Visual Landmark Recognition and Spatial Navigation," Lund Univeristy Cognitive Science, 1997, pp. 1-10.
Balkenius, et al., "The Xt-1 Vision Architecture", *Symposium on Image Analysis, Lund University Cognitive Science*, 1996, pp. 1-5.
Ballard, D. H., et al., "Generalizing the Hough Transform to Detect Arbitrary Shapes", *Pattern Recognition*, vol., 13, No. 2 Pergamon Press Ltd. UK, (1981), pp. 111-122.
Ballard, et al., "Searching Near and Approximate Location", *Section 4.2, Computer Vision*, (1982),pp. 121-131.
Ballard, et al., "The Hough Method for Curve Detection", *Section 4.3, Computer Vision*, (1982), pp. 121-131.
Belongie, S. et al., "Shape Matching and Object Recognition Using Shape Contexts", *IEEE Transactions on Pattern Analysis and Machine Intelligence, IEEE Inc. New York*, vol. 24, No. 4, (Apr. 2003), 509-522.
Besl, et al., "A Method for Registration of 3D Shapes", *IEEE Transactions on Pattern Analysis and Machine Intelligence*, Feb. 1992, pp. 239-256, vol.14, No. 2.
Bishsel, M. et al., "Stategies of Robust Object Recognition for the Automatic Identification of Human Faces," (1991) pp. 1-157, PhD thesis, ETH, Zurich.
Bileschi, S. et al., "Advances in Component-based Face Detection", *Lecture notes in Computer Science, Springer Verlag, New York, NY*, vol. 2388, (2002), 135-143.
Blais, G et al., "Advances in Component-based Face Detection", *Lecture notes in Computer Science, Springer Verlag, New York, NY*, vol. 2388, (2002), 135-143.
Bookstein, F L., "Principal Warps: Thin-Plate Splines and the Decomposition of Deformations", *IEEE Transactions on pattern Analysis and Machine Intelligence, IEEE Inc., New York*, vol. 11, No. 6, (Jun. 1, 1989).
Borgefors, Gunilla "Hierarchical Chamfer Matching: A Parametric Edge Matching Algorithm", *IEEE Transaction on Pattern Analysis and Mchine Intelligence*, vol. 10, No. 6, (Nov. 1988).
Breuel, T "Geometric Aspects of Visual Object Recognition", *Technical Report 1374, MIT Artificial Intelligence Laboratory*, May 1992, pp. 1-173.
Brown, Lisa G., "A Survey of Image Registration Techniques", *ACM Computing Surveys*, vol. 24, No. 4 Association for Computing Machinery, (1992), pp. 325-376.
Bruckstein, Alfred M., et al., "Design of Shapes for Precise Image Registration", *IEEE Transaction on Information Theory*, vol. 44, No. 7, Nov. 1998.
Bruzug, T.M. et al., "Using an Entropy Similarity Measure to Enhance the Quality of DSA Images with an Algorithm Based on Template Matching", *Visualization in Biomedical Computer*, pp. 235-240 (1996).
Caelli, et al., "Fast Edge-Only Matching Techniques for Robot Pattern Recognition", *Computer Vision, Graphics and Image Processing 39*, Academic Press, Inc., (1987), pp. 131-143.
Caelli, et al., "On the Minimum Number Of Templates Required for Shift, Rotation and Size Invariant Pattern Recognition", *Pattern Recognition*, vol. 21, No. 3, Pergamon Press plc, (1988), pp. 205-216.
Chen, Y et al., "Object Modeling by Registration of Multiple Range Images", *in IEEE ICRA*, pp. 2724-2729 (1991).
Chen, Y et al., "Object Modeling by Registration of Multiple Range Images", *Image and Vision Computing*, vol. 10, No. 3, pp. 145-155 (1992).
Chiou-Ting Hsu, et al., Mutliresolution Feature-Based Image Registration, in Visual Communications and Image Procedding 2000, Proceedings of SPIE vol. 4067 (2000), pp. 1490-1498, Perth, Autralia, Jun. 20-23, 2000.
*Cognex Corporation, "Chapter 13 Golden Template Comparison," Cognex 3000/4000/5000 Vision Tools*, pp. 521-626 (2000).
*Cognex Corporation, Chapter 7 CONLPAS , Cognex 3000/4000/ 5000 Programmable Vision Engines, Vision Tools*, Revision 7.4, P/N 590-0136, pp. 307-340 (1996).
*Cognex Corporation, Cognex 3000/4000/5000 Vision Tool*, Revision 7.6, Chapter 4, Caliper Tool, 1996.
*Cognex Corporation, Cognex 3000/4000/5000 Vision Tool*, Revision 7.6, Chapter 5, Inspection, 1996.
*Cognex Corporation, Cognex 3000/4400 SMD Tools*Release 5.2, SMD 2, 1994.
*Cognex Corporation, Cognex 4000/5000 SMD Placement Guidance Package*, User's Manual Release 3.8.00, 1998.
*Cognex Corporation, Cognex MVS-8000 Series, CVL Vision Tools Guide*, pp. 25-136 Release 5.4 590-6271 (2000).
*Cognex Corporation, Cognex MVS-80000 Series*, GDE User's Guide, Revision 1.1, Apr. 7, 2000.
*Cognex Corporation, description of Overlap in Cognex search tool and description of Overlap in Cnlpas Tool*as of Jul. 12, 1997.
*Cognex Products*on Sale as of one year before filing for U.S. Pat. No. 7,016,539, Jul. 12, 1997.
Cootes, T. F., et al., "Active Shape Models—Their Training and Application", *Computer Vision and Image Understanding*, vol. 61, No. 1, (Jan. 1995), 38-59.
Cox, I. et al., "On the Congruence of Noisy Images to Line Segment Models", *International Conference on Computer Vision*, pp. 252-258 (1988).
Cox, I. et al. 'Predicting and Estimating the Accuracy of a Subpixel Registration Algorithm, *IEEE Transactions on Pattern Analysis and Machine Intelligence*, vol. 12, No. 8, pp. 721-734 (Aug. 1990).
Crouzil, et al., "A New Correlation Criterion Based on Gradient Fields Similarity", *Proceedings of the 13th International Conference on Pattern Recognition*vol. I Track A, Computer Vision, (1996), pp. 632-636.
Dai, Xiaolong, A Feature-Based Image Registration Algorithm Using Improved Chain-Code Representation Combined with Invariant Moments, IEEE Transactions on Geoscience and Remote Sensing, vol. 37, No. 5, Sep. 1999.
Dana, K et al., "Registration of Visible and Infrared Images", pp. 1-12, vol. 1957.
Declerck, J et al., "Automatic Registration and Alignment on a Template of Cardiac Stress & Rest SPECT Images", *IEEE Proc of MMBIA*1996, pp. 212-221.
Defigueiredo, et al., "Model Based Orientation Independent 3-D machine Vision Techniques,", *IEEE Transactions on Aerospace and Electronic Systems*, vol. 24, No. 5 Sep. 1988, pp. 597-607.
Dementhon, D et al., "Model-Based Object Pose in 25 Lines of Code", *Proceedings of the Second European Conference on Computer Vision*, pp. 335-343 (1992).
Dementhon, et al., "Model-Based Object Pose in 25 Lines of Code", *International Journal of Computer Vision*, 1995, pp. 123-141, *Kluwer Academic Publishers, Boston, Ma.*
Devernay, F. "A Non-Maxima Suppression Method for Edge Detection with Sub-Pixel Accuracy", *Institut National de Recherche en Informatique et en Automatique*, No. 2724, Nov. 1995, 24 pages.
Dorai, C et al., "Optimal Registration of Multiple Range Views", *IEEE 1994*, pp. 569-571.

(56) References Cited

OTHER PUBLICATIONS

Drewniok, C et al., "High-Precision Localization of Circular Landmarks in Aerial Images", *Proc. 17, DAGM-Symposium, Mustererkennung 1995*, Bielfield, Germany, Sep. 13-15, 1995, pp. 594-601.
Eric, et al., "On the Recognition of Parameterized 2D Objects, International Journal of Computer Vision", (1988),353-372.
Feddema, J.T. et al., "Weighted Selection of Image Features for Resolved Rate Visual Feedback Control" *IEEE Transactions on Robotics and Automation*, vol. 7 No. 1, Feb. 1991, pp. 31-47.
Feldmar, et al., "3D-2D Projective Registration of Free-Form Curves and Surfaces", *Computer Vision and Image Understanding*, vol. 65, No. 3, (Mar. 1997), 403-424.
Fischer, Andre et al., "On the Use of Geometric and Semantic Models for Component-Based Building Reconstruction", Institute for Photography, University of Bonn, pp. 101-119, 1999.
Fitzpatrick, J M., et al., "Handbook of Medical Imaging", vol. 2: *Medical image Processing and Analysis*, SPIE Press, Bellingham, WA, (2000), 447-513.
Foley, James D. et al., "Second Edition in C, Computer Graphics Principles and Practice" pp. 48-51, Addison-Wesley Publishing Company, 1996, USA.
Foley, J.D. et al., "Introduction to Computer Graphics", pp. 36-49 (1994).
Forsyth, D et al., "Invariant Descriptors for 3-D Object Recognition and Pose", *IEEE Transactions on Pattern Analysis and Machines Intelligence*, vol. 13, No. 10, Oct. 1991, pp. 971-991.
Foster, Nigel J., "Determining objection orientation using ellipse fitting", *SPIE vol. 521-Intelligent Robots and Computer Vision*, 1985 pp. 34-43.
Foster, Nigel J., et al., "Attributed Image Matching Using a Minimum Representation Size criterion", *PhD. Thesis, Carnegie mellon University*, 1987, pp. 1-142.
Foster, Nigel J., et al., "Determining objection orientation from a single image using multiple information sources", *CMU-RI-TR-84-15*, Jun. 1984, pp. 1-96.
Gavrila et al., "3D Model-Based Tracking of Human Upper Body Movement: A multi-View Approach," Computer Vision Laboratory, 1996, pp. 73-80.
Gavrila et al., "3D Model-Based Tracking of Human Upper Body Movement: A multi-View Approach," Computer Vision Laboratory, 1995, pp. 253-258.
Gavrila, D et al., "Multi-Feature Hierarchical Template Matching using Distance Transforms", *Daimler-Benz AG*, Research and Technology, 6 pages, 1996.
Gdalyahu, Yoram et al., "Self-Organization in Vision: Stochastic Clustering for Image Segmentation, Perceptual Grouping, and Image Database Organization", *IEEE Transactions on Pattern Analysis and Machine Intelligence, IEEE Inc., New York, US*, vol. 23, No. 10, Oct. 2001, 1053-1074.
Ge, T et al., "Surface-based 3-D image registration using the Iterative Closest Point Algorithm with a closest point transform", *Medical Imaging 1996: Image Processing*, M. Loew, K. Hanson, Editors, *Proc. SPIE 2710*, pp. 358-367 (1996).
Geiger, et al., "Dynamic Programming for Detecting, Tracking, an Matching Deformable contours", *IEEE*(1995), pp. 294-302.
Gennery, D. "Visual Tracking of Known Three-Dimensional Objects," International Journal of Computer Vision, vol. 7, No. 3, pp. 243-270 (1992).
Gorman, "Recognition of incomplete polygonal objections", *IEEE*, pp. 518-522.
Gottesfeld, Brown L., et al., "A Survey of Image Registration Techniques", *Department of Computer Science, Columbia University, New York, NY 10027, ACM Computing Surveys*, vol. 24, No. 4, Dec. 1992.
Gottesfeld, Brown L., et al., "Registration of Planar Film Radiographs with Computed Tomography", *1996 Workshop on mathematical Methods in Biomedical Image Analysis(MMBIA'96)*, pp. 42-51 (1996).
Grimson, et al., "On the Sensitivity of the Hough Transform for Object Recognition", *IEEE Transactions on Pattern Analysis and Machine Intelligence*, vol. 12. No. 3, (1990), pp. 255-274.
Haag, M et al., "Combination of Edge Element and Optical Flow Estimates for 3D Model Based Vehicle Tracking in Traffic Images Sequences", *International Journal of Computer Vision*, 1999, pp. 295-319.
Han, et al., "An Edge-Based Block Matching Technique for Video Motion", *Image Processing Algorithms and Techniques II*, 1991, pp. 395-408, vol. 1452.
Haralick, R et al., "Pose Estimation from Corresponding Point Data", *IEEE Trans. On Systems, Man and Cybernetics*, vol. 19, No. 6, pp. 1426-1445, 1989.
Hashimoto, et al., "An Edge Point template Matching Method for High Speed Difference Detection between Similar Images", *Industrial Electronics and systems Development Laboratory Mitsubishi Electric Corp., PRU*, vol. 90, No. 3, (1990), 8 pages.
Hashimoto, et al., "High Speed Template Matching Algorithm Using Information of Edge Points", *Trans IEICE Technical Report D-II*, vol. J74-D-II, No. 10, pp. 1419-1427 (Oct. 1991).
Hashimoto, et al., "High-Speed Template Matching Algorithm Using Imformation of Contour Points", *Systems and Computers in Japan*, 1992, pages 78-87, vol. 23, No. 9.
Hashimoto, et al., "High-Speed Template Matching Algorithm Using Contour Information", *Proc. SPIE*, vol. 1657, pp. 374-385 (1992).
Hauck, a et al., "A Hierarchical World Model with Sensor—and Trask-Specific Features", 8 pages 1996.
Havelock, David I., "Geometric Precision in Noise-Fee Digital Images", *IEEE Transactions on Pattern Analyisi and Machine Intelligence*, vol. II, No. 10, Oct. 1989.
Hill, D et al., "Voxel Similarity Measures for Automated Image Registration", *Prov. SPIE*, vol. 2359, pp. 205-216 (1994).
Hill, et al., "Medical Image Registration", *Institute of Physics Publishing*; Phys. Med. Biol. 46 (2001), pp. R1-R45.
Hill, John W., "Machines Intelligence Research Applied to Industrial Automation", *U.S. Department of Commerce, National Technical Information Service, SRI International Tenth Report*, Nov. 1980.
Hirako, K "Development of an automatic detection system for microcalcifications lesion in mammography", *Trans. IEICE Japan D-II*, vol. J78-D-II No. 9, pp. 1334-1343 (Sep. 1995).
Hirooka, M et al., "Hierarchical distributed template matching", *Proc. SPIE*vol. 3029, p. 176-183 (1997).
Hoff, W.A. et al., "Pose Estimation of Artificial Knee Implants in Fluoroscopy Images Using a Template Matching Technique", *Proc. Of 3rd IEEE Workshop on Applications of Computer Vision*, Dec. 2-4, 1996, 7 pages.
Holden, M et al., "Voxel Similarity Measures for 3D Serial MR Brain image Registration", *IEEE Transactions on Medical Imaging*, vol. 19, No. 2 pp. 94-102 (2000).
Hoogs, Anthony et al., "Model Based Learning of Segmentations", pp. 494-499, IEEE, 1996.
Hsieh, et al., "Image Registration Using a New Edge-Based Approach", *Computer Vision and Image Understanding*, vol. 67, No. 2, (1997), pp. 112-130.
Hu, et al., "Expanding the Range of Convergence of the CORDIC Algorithm", *IEEE Transactions on Computers*vol. 40, No. 1, pp. 13-21 (Jan. 1991).
Hu, Y "CORDIC-Based VLSI Architectures for Digital Signal Processing", *IEEE Signal Processing Magazine*pp. 16-35, 1053-5888/ 92 (Jul. 1992).
Hugli, et al., "Geometric matching of 3D objects assessing the range of successful initial configurations", *IEEE*pp. 101-106, 1997.
Hung, D et al., "Subpixel Edge Estimation Using Geometrical Edge Models with Noise Miniatruization", 1994, pp. 112-117.
Hutchinson, Seth et al., "A Tutorial on Visual Servo Control", *IEEE Transactions on Robotics and Automation*, vol. 12, No. 5, Oct. 1996, 20 pages.
Huttenlocher, D.F. et al., "A Multi-Resolution Technique for Comparing Images Using the Hausdorff Distance", *1993 IEEE*, pp. 705-706.
Huttenlocher, Daniel P., "Comparing Images using the Hausdorff Distance", *IEEE Transactions on Pattern Analysis and Machine Intelligence*, vol.15, No. 9, (Sep. 1993).

(56) References Cited

OTHER PUBLICATIONS

Jacobs, D.W. "The Use of Grouping in Visual Object Recognition", *MIT Artificial Intelligence Laboratory, Office of Naval Research*, pp. 1-162, Oct. 1988.
Jahne, B et al., "Geissler, Handbook of Computer Vision and Applications", vol. 2, *Academic Press*, (1990) Chapter 5, 43 pages.
Jain, A.K. et al., "Object Matching Using Deformable Templates, IEEE Transactions on Pattern Analysis and Machine Intelligence," Mar. 1996, pp. 267-278, vol. 18, No. 3.
Jain, R et al., "Machine Vision", *McGraw-Hill*, 1995, 207 pages.
Jebara, T.S. "3D Pose Estimation and Normalization for Face Recognition", *Undergraduate Thesis, Department of Electrical Engineering, McGill University*, May 1996, 138 pages.
Jiang, H. et al., "A New Approach to 3-D Registration of Multimodality Medical Images by Surface Matching", *SPIE* vol. 1808, pp. 196-213 (1992).
Jiang, H. et al., "Image Registration of Multimodality 3-D Medical Images by Chamfer Matching", *Biomedical Image Processing and Three Dimensional Microscopy, SPIE* vol. 1660, pp. 356-366 (1992).
Jokinen, 0 "Area-Based Matching for Simultaneous Registration of Multiple 3D Profile Maps", *CVIU*, vol. 71, No. 3, pp. 431-447 (Sep. 1998).
Jokinen, 0 "Area-Based Matching for Simultaneous Registration of Multiple 3D Profile Maps", *Institute of Photogrammetry and Remote Sensing, Helsinki Univ. Of Tech.*, 16 pages 1998.
Jokinen, 0 "Building 3-D City Models from Multiple Unregistered Profile Maps", *First International Conference on Recent Advances in 3-D Digital Imaging and Modeling*, pp. 242-249 (1997).
Jokinen, 0 "Matching and modeling of multiple 3-D disparity and profile maps", *Ph.D Thesis Helsinki Univ. Of Technology*, Helsinki, Finland (2000).
Jokinen, 0 et al., "Relative orientation of two disparity maps in stereo vision", 6 pages 1995.
Jordan, J "Alignment mark detection using signed-contrast gradient edge maps", *Proc. SPIE* vol. 1661, pp. 396-407 (1992).
Joseph, S. H., "Fast Optimal Pose Estimation for Matching in Two Dimensions", *Image Processing and its Applications, Fifth International Conference*, (1995).
Kashioka, Seiji et al., "A transistor Wire-Bonding System Utilizing Multiple Local Pattern Matching Techniques", pp. 562-570 (1976).
Kawamura, et al., "On-Line Recognition of Freely Handwritten Japanese Characters Using Directional Feature Densities", *IEEE*, pp. 183-186, 1992.
Kersten, T et al., "Automatic Interior Orientation of Digital Aerial Images", *Photogrammetric Engineering & Remote Sensing*, vol. 63, No. 8, pp. 1007-1011.
Kersten, T et al., "Experience with Semi-Automatic Aerotriangulation on Digital Photogrammetric Stations", *Great Lakes Conference on Digital Photogrammetry and Remote Sensing*(1995).
Koller, D et al., "Model-Based Object Tracking in Monocular Image Sequences of Road Traffic Scenes", *International Journal of Computer Vision*, 1993, pp. 257-281.
Kollnig, H et al., "3D Post Estimation by Directly Matching Polyhedral Models to Gray Value Gradients", *International Journal Computer Vision*, 1997, pp. 283-302.
Kollnig, H et al., "3D Post Estimation by Fitting Image Gradients Directly to Polyhedral Models", *IEEE*, 1995, pp. 569-574,.
Kovalev, et al., "An Energy Minimization Approach to the Registration, Matching and Recognition of Images", *Lecture Notes in Computer Science*, vol. 1296, *Proceedings of the 7th International Conference on Computer Analysis of Images and Patterns*, pp. 613-620 (1997).
Lamdan, et al., "Affine Invariant Model-Based Object Recognition", *IEEE Transactions on Robotics and Automation*, Oct. 1990, pp. 578-589, vol. 6.
Lang, G.K. et al., Robust Classification of Arbitrary Object Classes Based on Hierarchical Spatial Feature-Matching, Machine Vision and Applications, 1997, pp. 123-135.
Lanser, S et al., "MORAL—A Vision-Based Object Recognition System for Autonomous Mobile Systems", 9 pages 1997.
Lanser, S. et al., "Robust Video-Based Object Recognition Using CAD Models", 8 pages 1995.
Lemieux, L et al., "A Patient-to-Computer-Tomography Image Registration Method Based on Digitally Reconstructed Radiographs", *Med. Phys.*, vol. 21, No. 11, pp. 1749-1760 (Nov. 1994).
Li, H et al., "A Contour-Based Approach to Multisensor Image Registration", *IEEE Transactions on Image Processing*, Mar. 1995, pp. 320-334, vol. 4, No. 3.
Li, Z et al., "On Edge Preservation in Multiresolution Images, Graphical Models and image Processing", 1992, pp. 461-472, vol. 54 No. 6.
Lin, et al., "On-Line Cordic Algorithms", *IEEE Transactions on Computers*, pp. 1038-1052. vol. 39, No. 8 1990.
Lindeberg, T "Discrete Derivative Approximations with Scale-Space Properties: A Basis for Low-Level Feature Extraction", *Journal of Mathematical Imaging and Vision*, 1993, pp. 349-376.
Lu, F., Shape Registration Using Optimization for Mobile Robot Navigation, Department of Computer Science, University of Toronto, 1995, pp. 1-163.
Maes, et al., "Multimodality Image Registration by maximization of Mutual Information", *IEEE Transactions on Medical Imaging*, vol. 16, No. 2, Apr. 1997, pp. 187-198.
Maes, F "Segmentation and Registration of Multimodal Medical Images", *PhD thesis Katholieke Universiteit Leuven*(1998).
Maes, F et al., "Comparative evaluation of multiresolution optimization strategies for multimodality image registration by maximization of mutual information", *Medical Image Analysis*, vol. 3, No. 4, pp. 373-386 (1999).
Maio, D. et al., Real-time face location on Gray-Scale Static Images, Pattern Recongition, The Journal of the Pattern Recognition Society, 2000, pp. 1525-1539.
Makous, W "Optimal Patterns for Alignment", *Applied Optics*, vol. 13, No. 3, Mar. 1974, 6 pages.
Marchand, E et al., "A 2D-3D Model-Based Approach to Real-Time Visual Tracking", *Institut National de Recherche en Informatique et en Automatique*, No. 3920, Mar. 2000, 33 pages.
Marchand, E et al., "Robust Real-Time Visual Tracking using a 2D-3D Model Based Approach", IEEE 7 pages 1999.
Masuda, et al., "A robust Method for Registration and Segmentation of Multiple Range Images", *Computer Vision and Image Understanding*, vol. 61, No. 3, May 1995, pp. 295-307.
Masuda, et al., "Detection of partial symmetry using correlation with rotated reflected images", *Pattern Recognition*, vol. 26, No. 88, pp. 1245-1253 (1993).
McGarry, Joh N *Description of Acumen radius of inhibition*, at least as early as Mar. 31, 1997.
McGarry, John *Description of AcuFinder boundary*, at least as early as Mar. 31, 1997.
McGarry, John *Description of AcuFinder high resolution search*, at least as early as Mar. 31, 1997.
McGarry, John *Description of AcuFinder models*, at least as early as Mar. 31, 1997.
McGarry, John Description of *AcuFinder search results*, at least as early as Mar. 31, 1997.
McGarry, John *Description of search zone*, at least as early as Mar. 31, 1997.
McGarry, John John McGarry, *Description of AcuFinder search space sampling rate*, at least as early as Mar. 31, 1997.
Medina-Mora, R "An Incremental Programming Environment", *IEEE Transactions on Software Engineering*, Sep. 1981, pp. 472-482, vol. DE-7, No. 5, 1992.
Mehrotra, Rajiv et al., "Feature-Based Retrieval of Similar Shapes", *Proceedings of the International Conference on Data Engineering*, Vienna, IEEE Comp. Soc. Press, vol. COnf. 9, (Apr. 19, 1993), 108-115.
Meijering, et al., "Image Registration for Digital Subtraction Angiography", *International Journal of Computer Vision*, vol. 31, No. 2, pp. 227-246 (1999).
Miller, et al., "Template Based Method of Edge Linking Using a Weighted Decision", *IEEE*, pp. 1808-1815, 1993.
Neveu, et al., "Two-Dimensional Objet Recognition Using Multiresolution Models, Computer Vision, Graphics, and Image Processing, 1986, pp. 52-65."

(56) References Cited

OTHER PUBLICATIONS

Newman, Tomothy A., et al., "3D CAD-Based inspection I: Coarse Verification", *IEEE*, 1992, pp. 49-52.

Oberkampf, D et al., "Iterative Pose Estimation Using Coplanar Feature Points", *Computer Vision and Image Understanding*, vol. 63, No. 3, pp. 495-511.

Oberkampf, D et al., "Iterative Pose Estimation Using Coplanar Feature Points", *International Conference on Computer Vision and Pattern Recognition*, pp. 626-627 (1993).

O'Gorman, Lawrence "Subpixel Precision of Straight-Edged Shapes for Registration and Measurement", *IEEE Transactions on Pattern Analysis and Machine Intelligence*, vol. 18, No. 7, Jul. 1996, 6 pages.

Ohm, Jens-Rainer "Digitale Bildcodierung", *Springer Verlag*, Berlin 217580, XP0002303066, Section 6.2 Bewegungschatzung, (1995).

Olson, C.F. et al., "Automatic Target Recognition by Matching Oriented Edge Pixels", *IEEE Transactions on Image Processing*, Jan. 1997, pp. 103-113, vol. 6, No. 1, (1997).

Olson, et al., "Automatic Target Recognition by Matching Oriented Edge Pixels", *IEEE Transactions on Image Processing*, Jan. 1997, pp. 103-113, vol. 6, No. 1, (1997).

Pauwels, E. J., et al., "Finding Salient Regions in Images", *Computer Vision and Image Understanding, Academic Press*, San Diego, CA, US, vol. 75, No. 1-2 (Jul. 1999), 73-85.

Perkins, W.A. "Inspector: A computer Vision System That Learns to Inspect Parts," IEEE Transactions on Pattern Analysis and Machine Intelligence, Nov. 1983, pp. 584-592, vol. PAMI-5, No. 6.

Plessey Semiconductors, *Preliminary Information*, Publication No. PS2067 (May, 1986), 1-5.

Pluim, et al., "Interpolation Artifacts in Mutual Information-Based Image Registration", *Computer Vision and Image Understanding* 77, 211-232 (2000).

Pluim, J "Multi-Modality Matching Using Mutual Information", *Master's thesis, Department of Computing Science, University of Groningen* (1996).

Pluim, J.P.W. et al., "Mutual information matching and interpolation artefacts" , *Proc. SPIE*, vol. 3661, (1999), 10 pages.

Pratt, William K., "Digital Image Processing", *Sun Microsystems, Inc.*, pages 651-673, (1978).

Ray, R. "Automated inspection of solder bumps using visual signatures of specular image-highlights", *Computer Vision and Pattern Recognition, Proceedings CVPR*, (1989),588 - 596.

Rueckert, D. et al., "Non-rigid Registration of Breast MR Images Using Mutual Information." Proceedings of the Medical Image Computing and Computer Assisted Intervention Society, pp. 1144-1152 (1998).

Rignot, E. et al., "Automated Multisensor Registration: Requirements and Techniques", *Photogrammetric Engineering & Remote Sensing*, vol. 57, No. 8, pp. 1029-1038 (1991).

Roche, a et al., "Generalized Correlation Ratio for Rigid Registration of 3D Ultrasound with MR Images", *Medical Image Computing and Computer-Assisted Intervention— MICCAI* 2000, pp. 567-577 (2000).

Roche, a et al., "Multimodal Image Registration by Maximization of the Correlation Ratio", *Rapport de Recherche No. 3378, Unite de Recherche INRIA Sophia Antipolic, INRIA* (Aug. 1998).

Roche, a et al., "The Correlation Ratio as a new Similarity Measure for Multimodal Image Registration", *Medical Image Computing and Computer Assisted Intervention—MICCAI'98* pp. 1115-1124 (1998).

Rosenfeld, et al., "Coarse-Fine Template Matching", *IEEE Transactions on Systems, Man, and Cybernetics*, (1997), pp. 104-107.

Rueckert, D et al., "Nonrigid Registration using Free-Form Deformations: Application to Breast MR Images", *IEEE Transactions on Medical Imaging*, vol.18, No. 8, pp. 712-721 (1999).

Rummel, p. et al., "Workpiece Recognition and Inspection by a Model-Based Scene Analysis System", *Pattern Recognition*, 1984, pp. 141-148, vol. 17.

Sakai, T. et al., "Line Extraction and Pattern Detection in a Photograph," Pattern Recognition, 1969, pp. 233-248, vol. 1.

Sanderson, Arthur et al., "Attributed Image Matching Using a Minimum Representation Size Criterion,", *IEEE* 1989 pp. 360-365.

Scanlon, James et al., "Graph-Theoretic Algorithms for Image Segmentation", *Circuits and Systems, ISCAS '99 Proceedings of the 1999 IEEE International Symposium on Orlando, FL, IEEE*, (May 30, 1999),141-144.

Schutz, H et al., "Recognition of 3-D Objection with a Closest Point Matching Algorithm", Proc. Conference ISPRS intercommission workshop, vol. 30, issue 5W1 (1995) 6 pages.

Seitz, P. "The robust recognition of object primitives using local axes of symmetry", *Signal Processing*, vol. 18, pp. 89-108 (1989).

Seitz, Peter "Using Local Orientational Information as Image Primitive for Robust Object Recognition", *Visual Communications and Image Processing IV*, 1989, pp. 1630-1639, vol. 1199.

Shekhar, C et al., "Multisensor image registration by feature consensus", *Pattern Recognition*, vol. 32, No. 1, pp. 39-52 (1999).

Shi, Jianbo et al., "Normalized Cuts and Image Segmentation", *Computer Vision and Pattern Recognition, Proceedings, IEEE Computer Society Conference on San Juan, IEEE Comput. Soc.*, (Jun. 17, 1997), 731-737.

Shi, Jianbo et al., "Normalized Cuts and Image Segmentation", *IEEE Transaction on Pattern Analysis and Machine Intelligence*, vol. 22, No. 8, (Aug. 2000), 888-905.

Steger, C "An Unbiased Detector of Curvilinear Structures", *Technische universitat Munchen, Technical Report FGBV-96-03*, Jul. 1996, 32 pages.

Stevens, M.R. et al., "Precise Matching of 3-D Target Models to Multisensor Data", *IEEE Transactions on Image Processing*, vol. 6, No. 1, Jan. 1997, pages 126-142.

Stimets, R.W. et al., "Rapid Recognition of Object Outlines in Reduced Resolution Images", *Pattern Recoinition*, 1986, pp. 21-33 vol. 19, No. 1.

Stockman, G et al., "Matching images to models for registration and object detection via clustering", *IEEE Transaction of Pattern Analysis and Machine Intelligence, IEEE Inc.*, New York, vol. PAMI-4, No. 3, (1982).

Streilein, a et al., "Towards Automation in Architectural Photogrammetry: CAD Based 3D-Feature Extraction", *ISPRS Journal o fPhotogrammetry and Remote Sensing* pp. 4-15, 1994.

Studholme, C "Measures of 3D Medical Image Alignment", *PhD thesis, University of London* (1997).

Studholme, et al., "An Overlap Invariant Entropy Measure of 3D Medical Image Alignment", *Pattern Recognition, The Journal of the Pattern Recognition Society, Pattern Recognition 32*, 71-86 1999.

Suk, et al., "New Measures of Similarity Between Two Contours Based on Optimal Bivarate Transforms", *Computer Vision, Graphics and Image Processing*, 1984, pp. 168-182.

Sullivan, G. et al., "Model-based Vehicle Detection and Classification using Orthographic Approximations", *The University of Reading*, 10 pages 1996.

Sullivan, G.D. et al., "Model-based Vehicle Detection and Classification using Orthographic Approximations", *Image and Vision Computing 15*, 1997, pp. 649-654.

Tanaka, M et al., "Picture Assembly Using a Hierarchical Partial-Matching Technique", *IEEE Transactions on Systems, Man., and Cybernetics*, vol. SMC-8, No. 11, pp. 812-819 (Nov. 1978).

Tanimoto, S.L. "Template Matching in Pyramids", *Computer Graphics and Image Processing*, vol. 16, pp. 356-369 (1981).

Thevenaz, p. et al., "Optimization of Mutual Information for Multiresolution Image Registration", *IEEE Transactions on Image Processing*, vol. 9, No. 12, pp. 2083-2099 (Dec. 2000).

Tian, et al., "Algorithms for Subpixel Registration", *Computer Vision Graphics And Image Processing 35*, Academic Press, Inc., (1986), pp. 220-233.

Tretter, D. et al., "A multiscale Stochastic Image Model for Automated Inspection," IEEE Transactions on Image Processing, Dec. 1995, pp. 1641-1654, vol. 4, No. 12.

Turk, G et al., "Zippered Polygon Meshes for Range Images", *SIGGRAPH/ACM* 1994, 8 pages.

Ullman, S "Aligning pictorial descriptions: An approach to object recognition", *Cognition*, vol. 32, No. 3, pp. 193-254, Aug. 1989.

(56) References Cited

OTHER PUBLICATIONS

Ullman, S. et al., "Recognition by Linear Combinations of Models", *A.I. Memo No. 1152, Massachusetts Institute of Technology Artificial Intelligence Laboratory*, 1989, 43 pages.

Umeyama, S "Least Squares Estimation of Transformation Parameters Between Two Point Patterns", *IEEE Trans. On Pattern Analysis and Machine Intelligence*, vol. 13, No. 2, pp. 119-152, 1994.

Valkenburg, R.J. et al., "An Evaluation of Subpixel Feature Localisation Methods for Precision Measurement", *SPIE* vol. 2350, 1994, 10 pages.

Van Herk, M et al., "Automatic three-dimensional correlation of CT-CT, CTMRI, and CT-SPECT using chamfer matching", *Medical Physics*, vol. 21, No. 7, pp. 1163-1178 (1994).

Vosselman, G "Interactive Alignment of Parameterised Object Models to Images", *Commission III, Workinig Group 3*, 7 pp. 1998.

Wachter, S. et al., "Tracking persons in Monocular Image Sequences", Computer Vision and Image Understanding, vol. 74, No. 3, Jun. 1999, pages.

Wallack, Aaron "Algorithms and Techniques for Manufacturing", *Ph.D. Thesis, University of California at Berkeley*, 1995, Chapter 4, 93 pages.

Wallack, Aaron S., "Robust Algorithms for Object Localization", *International Journal of Computer Vision*, (May, 1998), 243-262.

Weese, J. et al., "Gray-Value Based Registration of CT and MR Images by Maximization of Local Correlation", *Medical Image Computing and Computer-Assisted Intervention, MICCAT'98*, pp. 656-664 (1998).

Wei, Wen et al., "Recognition and Inspection of Two-Dimensional Industrial Parts Using Subpolygons", *Pattern Recognition, Elsevier, Kidlington, GB*, vol. 25 No. 12 (Dec. 1, 1992), 1427-1434.

Wells, et al., "Multi-modal vol. Registration by maximization of Mutual Information", *Medical Image Analysis* (1996) vol. 1, No. 1, pp. 35-51.

Wells, W "Statistical Approaches to Feature-Based Object Recognition", *International Journal of Computer Vision*, vol. 21, No. 1/2, pp. 63-98 (1997).

Wells, E. "Statistical Object Recognition," Pd.D. Thesis Submitted to the Massachusetts Institute of Technology, Department of Electrical Engineering and Computer Science, 1993, 177 pages.

Westling, M.D. et al., "Object recognition by fast hypothesis generation and reasoning about object interactions", 7 pages, 1996.

Whichello, A et al., "Document Image Mosaicing", *IEEE*, 3 pages. 1998.

White, et al., "Two Methods of Image Extension", *Computer Vision, Graphics, and Image Processing 50*, 342-352 1990.

Wilson, S "Vector morphology and iconic neural networks", *IEEE Trans. Systems Man. Cybernet*, vol. 19, No. 6, pp. 1636-1644 (1989).

Wong, R et al., "Sequential hierarchical scene matching", *IEEE Trans. Comput.*, vol. C-27, pp. 359-366 (1978).

Worrall, A.D. et al., "Pose Refinement of Active Models Using Forces in 3D", 10 pages. 1994.

Wu, Yifeng et al., "Registration of a SPOT Image and a SAR Image Using Multiresolution Representation of a Coastline", *10th International Conference of pattern Recognition*, (Jun. 16-21, 1990), 913-917.

Wunsch, et al., "Registration of CAD-Models to Images by Iterative Inverse Perspective Matching", *German Aerospace Research Establishment—DLR Institute for Robotics and System Dynamics, Proceedings of the ICPR*, (1996).

Xie, Xuanli L., et al., "A New Fuzzy Clustering Validity Criterion and its Application to Color Image Segmentation", *Proceedings of the International Symposium on Intelligent Control, New York, IEEE*, (Aug. 13, 1991), 463-468.

Yamada, Hiromitsu "Map Matching-Elastic Shape Matching by Multi-Angled Parallelism", Apr. 1990, pp. 553-561, vol. J73-D-II, No. 4.

Zhang, Z "Iterative Point Matching for Registration of Free-Form Curves", *INRIA, Rapports de Recherche No. 1658, Programme 4, Robotique, Image et Vision, Unite De Recherche Inria-Sophia Antipolis*(Mar. 1992).

Zhang, Z "On Local Matching of Free-Form Curves", *British Machines Vision Conference*, pp. 347-356 (1992).

Zhang, Z. "Iterative point matching for registration of free-form curves and surfaces", *IJCV*, vol. 13, No. 2, pp. 119-152 (1994).

Zhang, Zhengyou "Parameter estimation techniques: A tutorial with application to conic fitting", *Imag Vision Comput; Image and Vision computing; Elsevier Science Ltd, Oxford England*, vol. 15, No. 1, (Jan. 1, 1997).

Hauk, a. et al., "Hierarchical Recognition of Articulated Objects from Single Perspective Views," 7 pages, IEEE Computer Society Conference on Computer Vision and Pattern Recognition, Proceedings. 1997.

Seitz, P., et al., "The Robust Recognition of Traffic Signs from a Moving Car," p. 287-294, Informatik-Fachberichte, vol. 290, 1991.

Sullivan, Neal T., "Semiconductor Pattern Overlay", Handbook of Critical Dimensions Metrology and Process Control, pp. 160-188, vol. CR52, SPIE Press (1993).

Tangelder, J.W.H. et al., "Measurement of Curved Objects Using gradient Based Fitting and CSG Models", IAPRS, Thessaloniki, vol. 32, 5W11, pp. 23-30, 1999.

\* cited by examiner

METHOD FOR PARTITIONING A PATTERN INTO OPTIMIZED SUB-PATTERNS

CROSS REFERENCE TO RELATED APPLICATIONS

This application is a continuation of U.S. patent application Ser. No. 10/625,201, filed Jul. 22, 2003 now U.S. Pat. No. 8,081,820, the contents of which are incorporated herein by reference.

FIELD OF THE INVENTION

This invention relates to machine vision systems, and particularly to methods for partitioning a machine vision image.

BACKGROUND OF THE INVENTION

Searching for a particular pattern in an image is a well-known problem in the art of machine vision, with many known solutions, such as feature-based search methods. Typically, the pattern is assumed to have undergone one or more of a few basic known transformations, such as having been scaled larger or smaller than the original pattern, or having been rotated. However, these known solutions often fail if the pattern has been deformed by being warped, pulled, bent, wrinkled, damaged, or otherwise fundamentally changed from the original pristine shape, or known transformations thereof, that the search method is adapted to find.

However, if the deformed pattern is broken down into smaller sub-patterns, those individual sub-patterns are themselves fairly similar to the corresponding parts of the original pattern bearing only minor deformation. For example, if the pattern has been bent into a "V" or boomerang shape, then the two legs of the boomerang both have good, easily found pieces of the pattern. Therefore, searching for a deformed pattern in an image may be facilitated by dividing the pattern into smaller sub-patterns, because for many typical types of deformation encountered, most of those sub-patterns can probably be found by known feature-based search methods because they are not themselves substantially distorted or deformed. Then, a subsequent algorithm can combine these partial results into a full match of the pattern.

The question is then how to divide the pattern into smaller sub-patterns. A human being can likely examine a large pattern, determine useful parts that will probably survive whatever deformation the image is expected to encounter, and divide it accordingly. However, automating the process is more difficult.

The obvious and standard way to automatically divide a pattern image into sub-patterns is to use a rectilinear grid, such as a tic-tac-toe grid or a checker board grid. Superimposing such a grid over the main pattern gives, for example, nine smaller sub-patterns. However, this method has significant drawbacks. Pattern matching is based on matching information in the source pattern with information in the target image. But useful information is not usually present uniformly throughout a pattern. Some of the sub-patterns selected with a grid may be blank, and consequently have no useful information contained therein. Some grid-based sub-patterns may have a small amount of information in one corner of the grid square and no information in the rest of it. And some may have a lot of dense information that would be more usefully split into smaller pieces. Further, grids divide the information of a pattern arbitrarily and indiscriminately. If, for example, part of the pattern is a small star, the grid lines might break that star up into two or even four parts, where a human operator would likely choose to keep the star together as one single, dense, easily found sub-pattern.

SUMMARY OF THE INVENTION

In one general aspect, the invention provides a method for partitioning a pattern into optimized sub-patterns. The method includes providing a list of features of the pattern, then generating a set of candidate partitions using the list of features of the pattern. Each candidate partition of the set of candidate partitions is then scored, and a best-scoring partition among the set of candidate partitions is determined based on the scoring of each candidate partition. Then, the best scoring partition is applied to the list of features so as to provide a plurality of sub-lists of features respectively representing a plurality of optimized sub-patterns.

In a preferred embodiment, providing a list of features includes using at least one sub-list from the plurality of sub-lists of features generated by an earlier application of the method as the list of features of the pattern. In another preferred embodiment, providing a list of features of the pattern includes providing an image, and extracting a list of features from the image. In a further preferred embodiment, extracting a list of features from the images includes sampling the image so as to provide a regular array of pixels. In an alternate embodiment, extracting a list of features from the images includes using an edge extraction method to provide an edge image, and sampling the edge image to provide a plurality of edge feature points. In a further preferred embodiment, each edge feature point includes the angle of the edge at that edge feature point.

In other preferred embodiments, features of the pattern are 2D image points. Alternatively, features of the pattern are points of any dimensionality.

In yet other embodiments, providing a list of features includes providing an abstract pattern description, and extracting a list of features from the abstract pattern description. In alternate preferred embodiments, providing a list of features includes providing a pre-generated list of features.

In another preferred embodiment, generating a set of candidate partitions using the list of features of the pattern includes using a clustering algorithm. In an alternate preferred embodiment, generating a set of candidate partitions using the list of features of the pattern includes using a spatial subdivision algorithm. In yet another embodiment, generating a set of candidate partitions using the list of features of the pattern includes using a method that yields sub-lists that include pattern features that span an area of the pattern that is spatially small with respect to the area of the entire pattern. In still another preferred embodiment, generating a set of candidate partitions using the list of features of the pattern includes using a method that provides sub-lists having pattern features that are more near to each other than to pattern features in other sub-lists. In a further preferred embodiment, generating a set of candidate partitions using the list of features of the pattern includes building a weighted graph using the list of features of the pattern, and partitioning the weighted graph to generate candidate partitions.

In a preferred embodiment, building a weighted graph using the list of features of the pattern includes fully connecting the feature points to make a graph, and assigning weights to each link. In an alternate preferred embodiment, building a weighted graph using the list of features of the pattern includes sparsely connecting the feature points to make a graph, and assigning weights to each link. In a further embodiment, the weight of each link is based on the distance between each pair of feature points. In other embodiments, weights decrease as the distance between feature points increases. In various other embodiments, the weights on each link are based on at least one of similarity of angle and similarity of magnitude. In yet other embodiments, the weights on each link are based on values associated with the feature points of the pattern. In still further embodiments, the weights on each link are determined such that larger weights represent a pair of features that tend to be together in the same sub-lists of features, and smaller weights indicate a pair of features that can be included in different sub-lists of features.

In some preferred embodiments, partitioning the weighted graph to generate candidate partitions includes dividing the weighted graph into two sub-graphs, one of which may be empty, and converting the two sub-graphs into two sub-lists of features. In other preferred embodiments, partitioning the weighted graph to generate candidate partitions includes partitioning the weighted graph using a "normalized cut" method to generate candidate partitions.

In a preferred embodiment, when generating a set of candidate partitions using the list of features of the pattern, at least one candidate partition has only a single sub-list of features of the pattern. In an alternate embodiment, when generating a set of candidate partitions using the list of features of the pattern, each candidate partition has many sub-lists of features of the pattern. In yet another alternate embodiment, when generating a set of candidate partitions using the list of features of the pattern, some features included in the list of features of the pattern do not appear on any sub-list of features of the pattern. In still another embodiment, when generating a set of candidate partitions using the list of features of the pattern, at least one feature of the pattern appears on a plurality of sub-lists of features of the pattern.

In more preferred embodiments, scoring each partition of the set of candidate partitions includes building sub-patterns using the set of candidate partitions, and scoring each candidate partition using a scoring function based on characteristics of a sub-pattern derived therefrom. In a further embodiment, characteristics of the sub-pattern includes spatial coherence of the features corresponding to the sub-pattern. In an alternate further embodiment, characteristics of the sub-pattern includes overall spatial size of the area spanned by the feature points corresponding to the sub-pattern. In a preferred embodiment, the area spanned by the feature points is represented by the smallest bounding box that includes all the feature points. In another embodiment, characteristics of the sub-pattern includes the number of feature points in the sub-pattern. In yet another embodiment, characteristics of the sub-pattern includes the total amount of weight in links "cut" by the partition algorithm to create the sub-pattern. In still another embodiment, characteristics of the sub-pattern includes the overall "suitability" of the sub-pattern used as a search pattern applied to the original pattern. In still other embodiments, characteristics of the sub-pattern includes spatial coherence of the features corresponding to the sub-pattern, overall spatial size of the area spanned by the feature points corresponding to the sub-pattern, the number of feature points in the sub-pattern, the total amount of weight in links "cut" by the partition algorithm to create the sub-pattern, and the overall "suitability" of the sub-pattern used as a search pattern applied to the original pattern.

In some preferred embodiments, the overall "suitability" of the sub-pattern used as a search pattern applied to the original pattern depends on the search algorithm used. In other preferred embodiments, the overall "suitability" of the sub-pattern used as a search pattern applied to the original pattern depends on degeneracy of the features of a sub-pattern. In yet other preferred embodiments, the overall "suitability" of the sub-pattern used as a search pattern applied to the original pattern depends on redundancy of the sub-pattern within the original pattern.

In a preferred embodiment, determining a best scoring partition based on the scoring includes using a partition score threshold. In some preferred embodiments, the partition score threshold is settable. In other preferred embodiments, the partition score threshold is predetermined. In yet other preferred embodiments, the partition score threshold includes a portion that is predetermined, and a portion that is settable. In a further embodiment, if no candidate partition has a score above the partition score threshold, then the list of features of the candidate partition is deemed to be one that cannot be usefully sub-divided.

In another general aspect, the invention provides a method for automatically extracting a plurality of sub-patterns from a pattern in an image, the method including extracting a plurality of features, building a connected graph using the plurality of features, and using the connected graph and a sub-division parameter to create a plurality of feature groups.

In another general aspect, the invention provides a method for dividing a pattern into a plurality of sub-patterns, each sub-pattern being adapted for use with an image search method that can provide a plurality of sub-pattern search results. In this aspect, the method includes representing the pattern as a plurality of feature points, generating candidate partitions of the plurality of feature points, scoring the candidate partitions by examining characteristics of each potential sub-pattern of each candidate partition, selecting the highest-scoring partition, and then applying it to the plurliaty of feature points so as to create one or more sub-pluralities of feature points. In a preferred embodiment, the sub-pluralities of feature points are used as sub-patterns by an image search method that is adapted to use pluralities of feature points. In another preferred embodiment, the characteristics of each potential sub-pattern of each candidate partition include area, number of feature points, and suitability of the sub-pattern for use with a particular search method.

The invention advantageously provides a plurality of sub-patterns where each sub-pattern contains a similar amount of information, where each sub-pattern has enough information to be located with a feature-based search method, and where that information has also been pre-evaluated as being useful and particularly adapted for running feature-based searches.

BRIEF DESCRIPTION OF THE DRAWING

The invention will be more fully understood by reference to the detailed description, in conjunction with the following figures, wherein:

FIG. 3b is a set of feature points resulting from an analysis of the sample image of FIG. 3a;

DETAILED DESCRIPTION

Figure 1A:
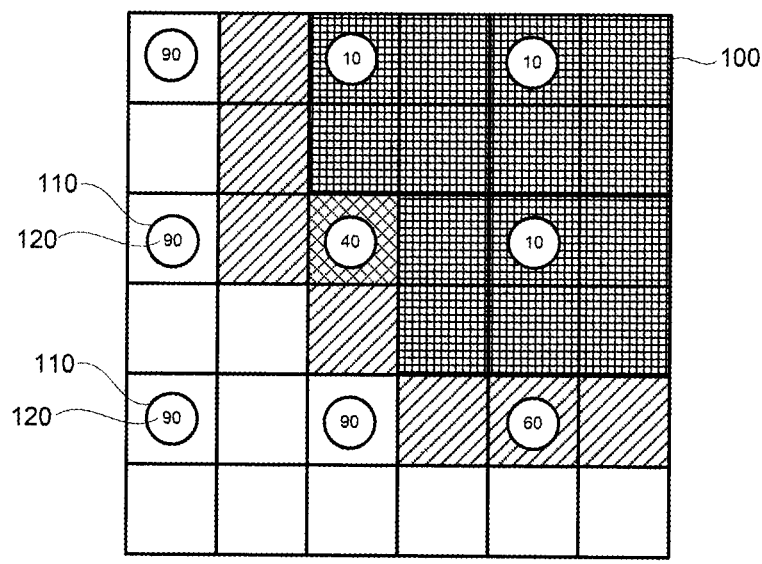
FIG. 1a is a depiction of an exemplary sampling of a pattern image consisting of a set of 2D pixels, each pixel including a brightness level.
Figure 1B:
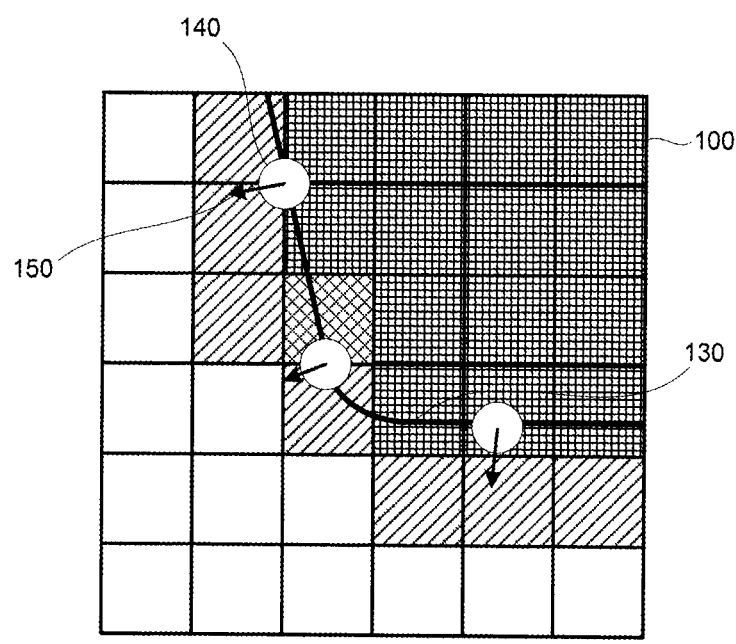
FIG. 1b is a depiction of an exemplary sampling of a pattern image consisting of a set of edges, each edge including an angle of the brightness gradient at that edge.
Figure 2:
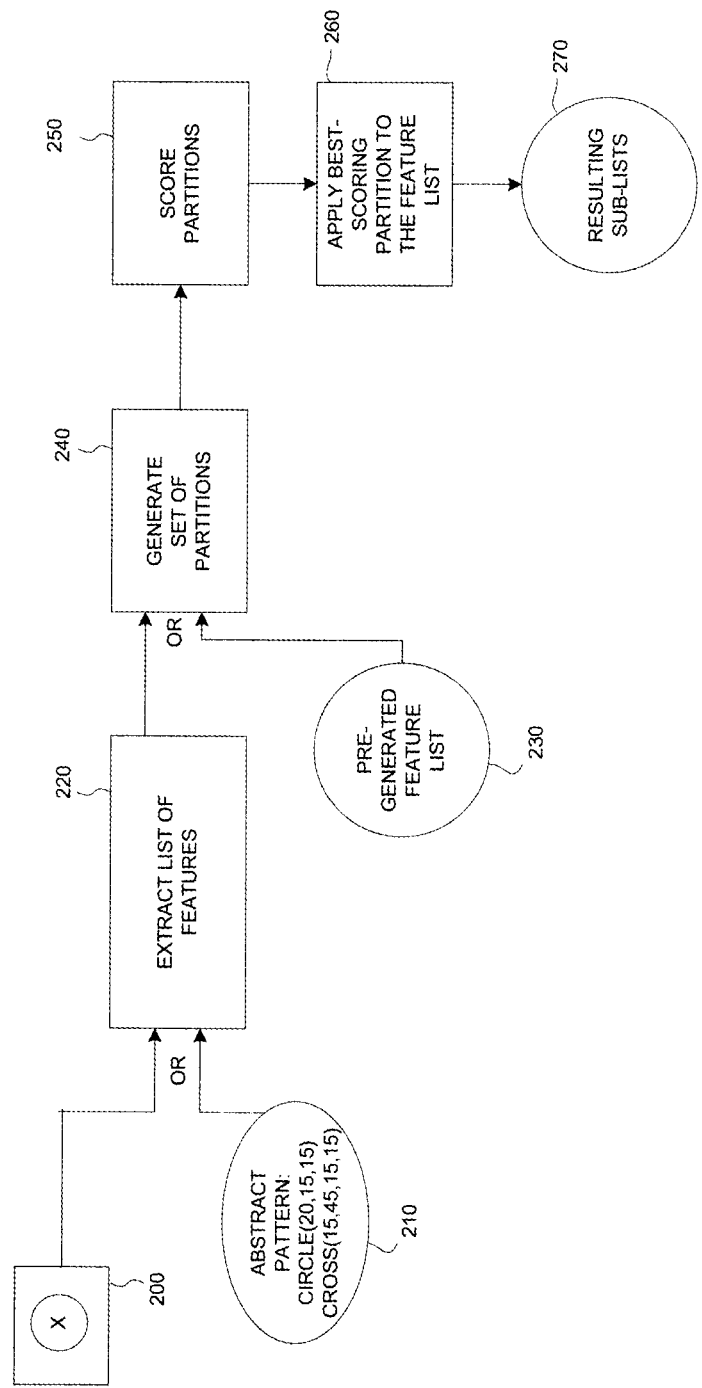
FIG. 2 is a flowchart of an embodiment of the method of the invention.
Figure 2A:
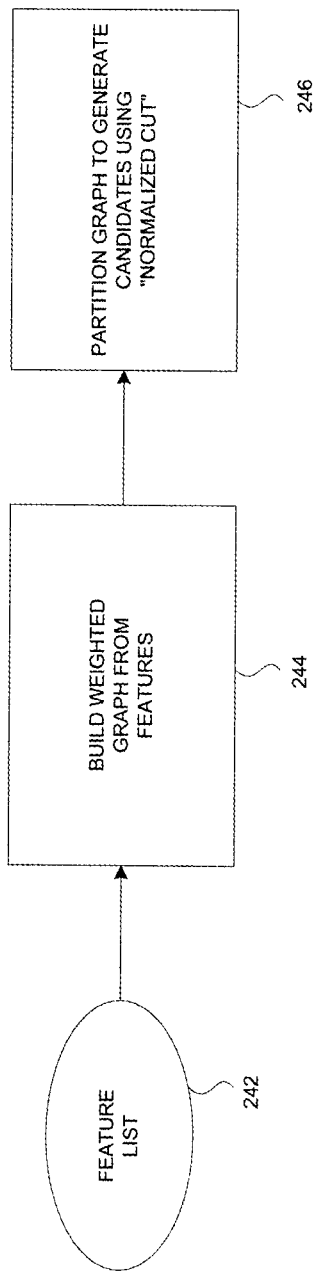
FIG. 2a is a flowchart of the step of generating a set of partitions of FIG. 2.
Figure 2B:
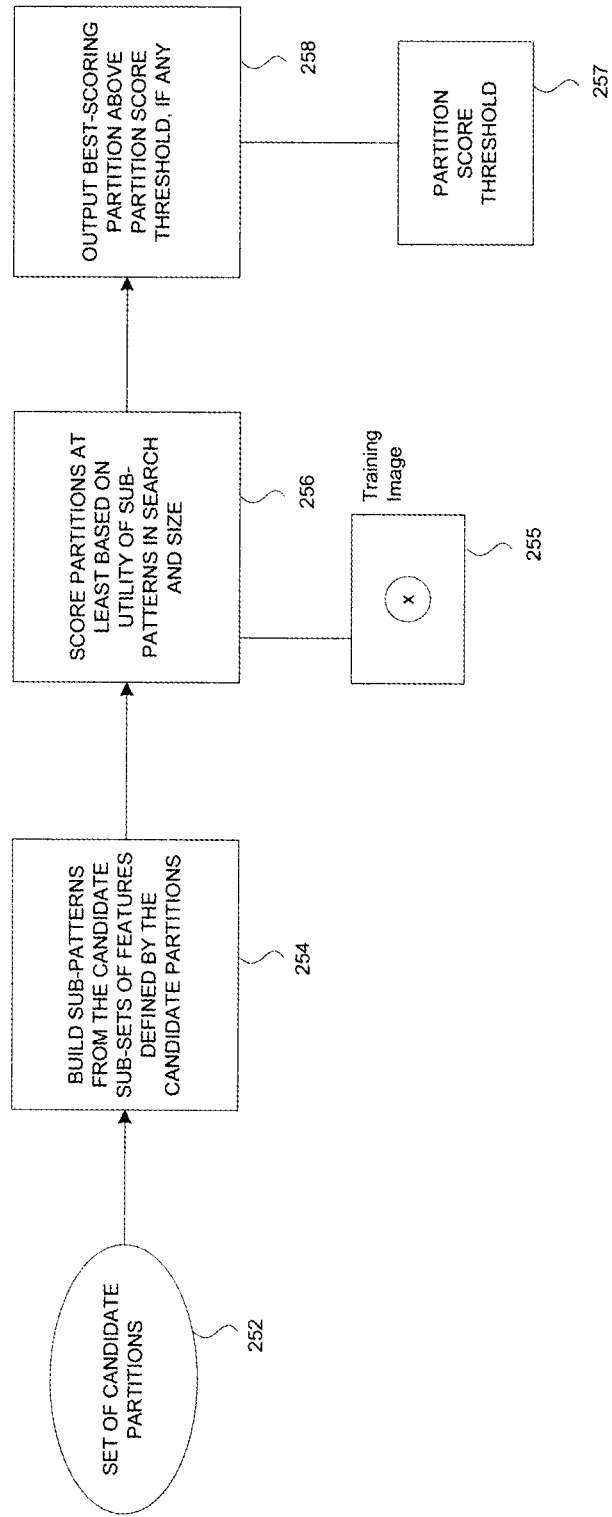
FIG. 2b is a is a flowchart of the step of scoring the partitions of FIG. 2.

The method of the invention uses information present in the pattern itself as the basis for dividing the pattern into smaller parts called sub-patterns. Pattern information is discretized into "feature points," which are points in the pattern where there is some feature, such as an edge, that can be used to effectively find the pattern. Many search methods are already based on such feature points, such as feature-based search methods, some of which may also be called "geometric" search methods. These feature points are then associated in small groups based on proximity to each other and other factors explained below, but without regard to such artificial means as grid-lines. The result is a plurality of sub-patterns where each sub-pattern contains a similar amount of information, where each sub-pattern has enough information to be located with a feature-based search (typically based on approximately 12 to 30 feature points, at differing angles), and where that information has also been pre-evaluated as being useful and particularly adapted for running feature-based searches. Less than 12 feature points may not be enough information for known feature-based searches, and more than 30 feature points can be usefully subdivided into two smaller sub-groups.

An embodiment of the method of the invention takes as input either an image of a pattern 200 or an abstract description of a pattern 210 (e.g. a circle of radius 20 at a point 15,15), either of which can be analyzed so as to provide a representative feature list 220, (where a feature is a point of interest in the pattern, possibly augmented by other information such as a gradient angle or magnitude), by any known feature extraction method, or more advantageously by using the two methods described herein below.

One preferred embodiment of this step 220 is to sample the pattern image 100 so as to provide a regular array of 2D points 110, each of which includes the image brightness level 120 at that point. FIG. 1a shows nine (9) such point features, each represented by a circle 110 containing a brightness level 120. Another preferred embodiment of 220 is to convert the image 100 into a list of interesting edges 130 using any known edge extraction method to do so, and sample those edges into edge feature points 140 that include the angle 150 of the brightness gradient (or the angle of the edge) at that point 140.

Alternatively, if some other method or tool has described the pattern as a list of features already, those features can be used directly 230, without the need for the pattern processing, such as described above. Note that features are typically 2D image points, but one skilled in the art can readily see that this method works identically with points of any dimensionality, such as 3D.

Figure 3A:
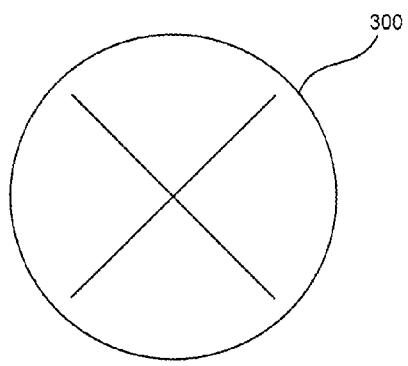
FIG. 3a is a sample image to be subdivided.
Figure 3B:
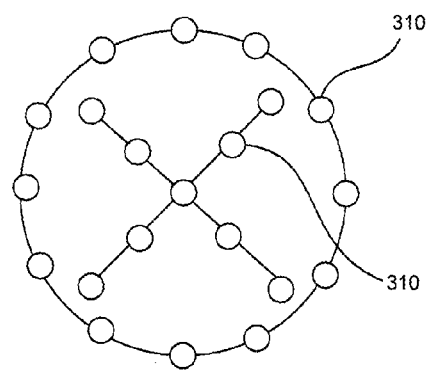
Figure 3C:
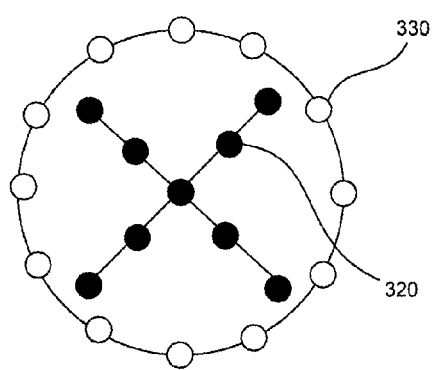
FIG. 3c is a first candidate partition of the set of feature points of FIG. 3b.
Figure 3D:
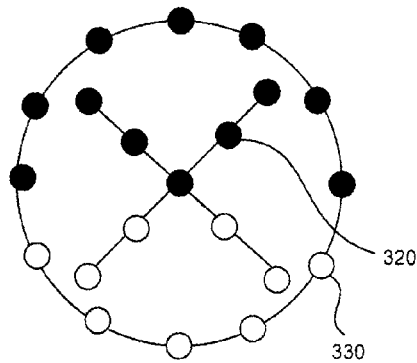
FIG. 3d is a second candidate partition of the set of feature points of FIG. 3b.

Using the feature list (from either step 220 or 230), step 240 generates a set of partitions of the list, where each partition includes a portion of the list. Each partition might have only a single sub-list, or it might have many sub-lists. Certain features from the original list might not appear on any sub-list, or a feature or features might appear on multiple sub-lists. Any method known in the art can be used to generate this set of partitions, such as any clustering algorithm, or any spatial subdivision algorithm. As an example, FIG. 3a shows a sample "image" 300 to be subdivided. FIG. 3b shows a sample breakdown of the image into feature points 310, as described above. FIGS. 3c and 3d show two different candidate partitions of that list of features, where the black circles 320 are partitioned into one list, and the white circles 330 into another. The best methods are those that tend to yield sub-lists that are spatially small, that is, where features that are near each other tend to be in the same sub-list.

A preferred embodiment for this step 240 is the "Normalized Cut" algorithm 246, as published in the article "Normalized Cuts and Image Segmentation" by Shi and Malik, 1997, herein incorporated by reference. To utilize this algorithm, the feature list is input 242 for conversion 244 into a weighted graph. The weighted graph is constructed by fully connecting the feature points to make a graph, and then setting the weights on each link based on the distance between those represented feature points.

Note that some weights might be zero, in which case those links can be ignored, and the fully connected graph is equivalent to a sparsely connected graph with those zero-weight links missing. This does not affect the method, though it may allow a particular implementation to be more efficient if it can take advantage of the smaller number of links.

Optionally, the weights can be set based on other values such as similarity of angle, magnitude, or any other values that may be available as part of the features themselves. Larger weights represent a pair of points that should stay in the same sub-lists together, while smaller weights indicate points that can be broken apart more easily. Therefore, in a preferred embodiment, weights decrease as the distance between feature points increases. Exact formulas, and the weightings of other feature characteristics, will vary based on the pattern domain, but any formula can be used and still remain within the spirit of the invention. The Normalized Cut method is one that generates multiple partitions which are pairs of sub-lists, where each node (or feature) appears in exactly one of the two lists. These partitions are generated in such a way that the total weight of links between elements of the two sub-lists is small, and the total weight of links between elements within each sub-list is large. This nicely meets the criteria recognized by the invention for a good partition, when weights are high for features spatially near to each other.

Figure 4A:
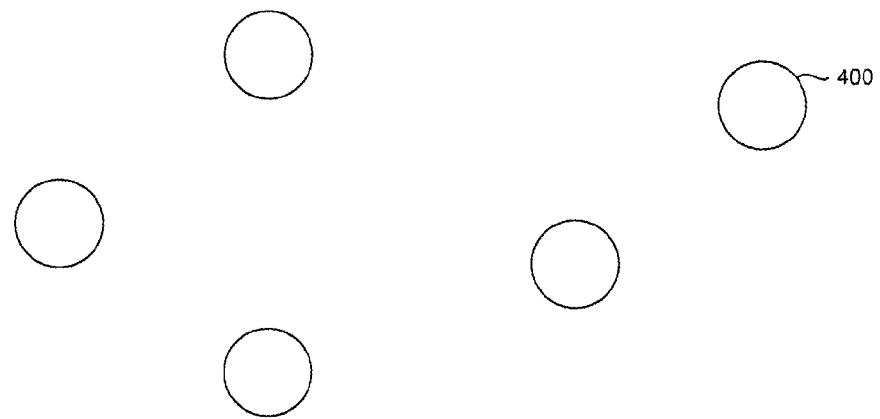
FIG. 4a is an example of a set of feature points, each point having only position information.
Figure 4B:
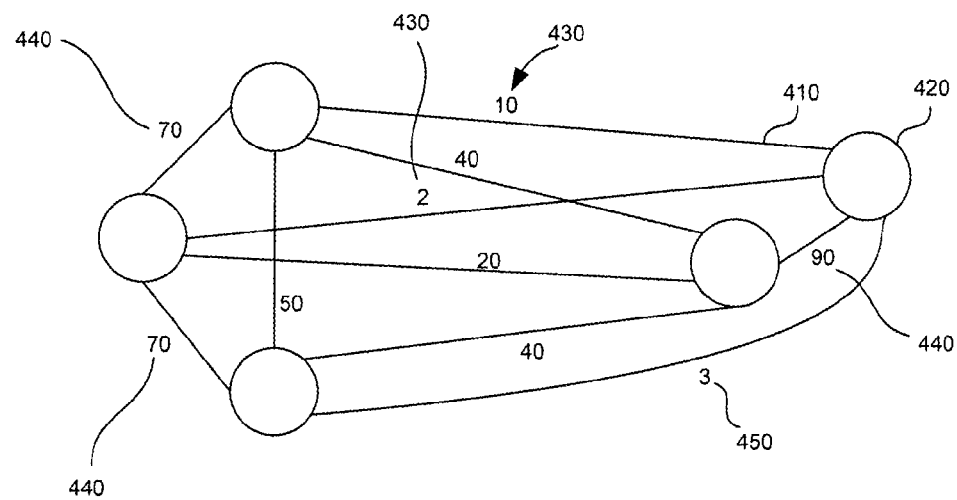
FIG. 4b is a fully connected graph of the set of feature points of FIG. 4a, including links having weights attached.

FIG. 4a is an example of a set of five feature points 400 each point having only position information. FIG. 4b shows a fully connected graph, where the links 410 between nodes 420 have weights 430 attached, with higher weights 440 on links between nodes near each other, and lower weights 450 on lines between more mutually distant nodes. When "Normalized Cut" is applied to this graph using the methods as published in the article cited above, it yields a list of partitions, each of which breaks the graph into two sub-graphs, one of which may be empty. These sub-graphs can be directly converted back into feature sub-lists, since each node in the graph represents exactly one feature point. In the example of FIG. 4b, the three nodes on the left will likely become one sub-list, and the two nodes on the right will become another sub-list, as the links between those sets of nodes have much lower weights than the links within each set.

A scoring function 250 is then applied to each candidate partition. The scoring function can take into account a number of factors. One embodiment of this function scores partitions based on the spatial coherence of the features in each sub-list, where "spatial coherence" refers to features that have positions near to each other, relative to the distances of other features. Since the node weights used for the preferred embodiment of the partitioning method are higher for features that are close to one another, those weights can easily be summed and used in this embodiment. Another embodiment determines the score based on overall spatial size of the area spanned by the feature points (e.g. as represented by the smallest bounding box that includes all the feature points) included in each sub-list. Another embodiment determines the score based on the number of feature points in each sub-list. A preferred embodiment of the function uses the total amount of weight in links "cut" by the partition algorithm (for the "Normalized Cut" partitioning method described above), and another preferred embodiment builds a search pattern 254 from each feature sub-set 252 and bases the score on the overall "suitability" (discussed below) of the sub-list as a search pattern on the original image 255. A preferred embodiment of this function is one that takes into account all of these elements 256 in determining the score. In this final embodiment, each scoring method is applied to the sub-lists to determine a set of scores. Those scores are combined, either by simply summing them or by computing a weighted average based on the applicability of each individual method in the target domain or by any other reasonable method, and the total score is used.

The last factor mentioned, that of "suitability" as a search pattern, depends on the particular algorithm that might later be used to do searching using the result of this invention. However, the "suitability" metric will likely include "degeneracy". For example, a sub-list where all points lie on the same line is probably not a suitable search pattern, nor is one where they lie on the same circle if the search will involve rotational uncertainty. The "suitability" metric will also likely include "redundancy" within the original pattern. For example, a set of features that can be matched at multiple locations, multiple angles, and/or multiple scales, etc., within the original pattern will probably yield undesirable and possibly unacceptable confusion during a search.

A preferred embodiment of this metric is to run the search algorithm itself on the training image—if that search algorithm is known at the time this method is used. If the search returns only one match, the prospective sub-pattern scores well, i.e., is "suitable"; if it returns multiple matches or confusion about where the sub-pattern is located, the sub-pattern scores poorly, i.e., is "unsuitable". One skilled in the art will readily recognize that any search algorithm will have certain factors that make some patterns easier to find (i.e., more "suitable") than others, and this invention allows those factors, whatever they may be, to affect the "suitability" of the sub-pattern, and thereby affect the score of the partitions.

There may be a score threshold 257 for this step, and that score threshold might be set outside the algorithm, or might be fixed within the algorithm, or might be based on a combination of multiple such values. If no partition has a score above this threshold, then the list of features is deemed to be one that cannot be usefully sub-divided.

Otherwise, the top-scoring candidate partition is then used to create sub-lists from the original feature list 260. A partition specifies which feature points go into which sub-lists. The set of sub-lists generated by this step, if any, is returned as the output of the algorithm 270. One skilled in the art can readily see that these output sub-lists may then be returned to the algorithm as a pre-generated feature list 230, in which case the sub-division can be further refined by repeated, recursive application of this method.

Other variants and embodiments will occur to those skilled in the art, without departing from the spirit and scope of the invention. Accordingly, the invention is not intended to be limited by the detailed description, except as set forth in the following claims.

The invention claimed is:

1. A method for partitioning a pattern into optimized sub-patterns, the method comprising:
   providing a list of features of the pattern;
   generating a set of candidate partitions using the list of features of the pattern;
   scoring each candidate partition of the set of candidate partitions by building sub-patterns using the set of candidate partitions, wherein the scoring includes analyzing degeneracy;
   determining a best-scoring partition among the set of candidate partitions;
   applying the best-scoring partition to the list of features so as to provide a plurality of sub-lists of features respectively representing a plurality of optimized sub-patterns.

2. The method of claim 1, wherein determining a best-scoring partition among the set of candidate partitions includes using a partition score threshold.

3. The method of claim 2, wherein the partition score threshold is settable.

4. The method of claim 2, wherein the partition score threshold is predetermined.

5. The method of claim 2, wherein the partition score threshold includes a portion that is predetermined and a portion that is settable.

6. The method of claim 2, wherein if no candidate partition has a score above the partition score threshold, then the list of features of the candidate partition is deemed to be one that cannot be usefully sub-divided.

7. The method of claim 1, wherein providing a list of features includes using at least one sub-list from the plurality of sub-lists of features generated by an earlier application of the method as the list of features of the pattern.

8. The method of claim 1, wherein providing a list of features of the pattern includes:
   providing and image; and
   extracting a list of features from the image.

9. The method of claim 1, wherein features of the pattern are 2D image points.

10. The method of claim 1, wherein features of the pattern are points of any dimensionality.

11. The method of claim 1, wherein providing a list of features includes:
    providing an abstract pattern description; and
    extracting a list of features from the abstract pattern description.

12. The method of claim 1, wherein providing a list of features includes providing a pre-generated list of features.

13. The method of claim 1, wherein generating a set of candidate partitions using the list of features of the pattern includes using a clustering algorithm.

14. The method of claim 1, wherein generating a set of candidate partitions using the list of features of the pattern includes using a spatial subdivision algorithm.

15. The method of claim 1, wherein generating a set of candidate partitions using the list of features of the pattern includes using a method that yields sub-lists that include pattern features that span an area of the pattern that is spatially small with respect to the area of the entire pattern.

16. The method of claim 1, wherein generating a set of candidate partitions using the list of features of the pattern includes using a method that provides sub-lists having pattern features that are more near to each other than to pattern features in other sub-lists.

17. The method of claim 1, wherein generating a set of candidate partitions using the list of features of the pattern includes:

building a weighted graph using the list of features of the pattern; and partitioning the weighted graph to generate candidate partitions.

18. The method of claim 1, wherein in generating a set of candidate partitions using the list of features of the pattern, at least one candidate partition has only a single sub-list of features of the pattern.

19. The method of claim 1, wherein in generating a set of candidate partitions using the list of features of the pattern, each candidate partition has many sub-lists of features of the pattern.

20. The method of claim 1, wherein in generating a set of candidate partitions using the list of features of the pattern, some features included in the list of features of the pattern do not appear on any sub-list of features of the pattern.

* * * * *